(12) United States Patent
Asam et al.

(10) Patent No.: US 7,703,812 B2
(45) Date of Patent: Apr. 27, 2010

(54) QUICK COUPLING

(75) Inventors: Dirk Asam, Ulm (DE); Roland Wachter, Oberroth (DE); Christian Walter, Oberrieden (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 341 days.

(21) Appl. No.: 11/731,578

(22) Filed: Mar. 30, 2007

(65) Prior Publication Data
US 2008/0036199 A1    Feb. 14, 2008

(30) Foreign Application Priority Data
Mar. 31, 2006    (DE)    ............... 20 2006 005 203 U (51) Int. Cl.
*F16L 37/00*    (2006.01)

(52) U.S. Cl. ............... 285/38; 285/19; 285/33; 285/124.3; 285/312; 285/920

(58) Field of Classification Search ............ 385/33, 385/34, 38, 124.3, 124.4, 19, 20, 124.1, 124.2, 385/922, 124.5, 311, 312, 325, 326, 920
See application file for complete search history.

(56) References Cited

U.S. PATENT DOCUMENTS

| | | | | |
|---|---|---|---|---|
| 4,103,712 A | * | 8/1978 | Fletcher et al. | 137/637.05 |
| 4,982,929 A | * | 1/1991 | Spurling | 251/149.9 |
| 5,026,099 A | * | 6/1991 | Hendrix | 285/315 |
| 5,316,347 A | | 5/1994 | Arosio | |
| 6,443,498 B1 | * | 9/2002 | Liao | 285/124.1 |
| 7,021,668 B2 | * | 4/2006 | Langenfeld et al. | 285/38 |
| 2005/0285390 A1 | * | 12/2005 | Martin | 285/124.5 |

FOREIGN PATENT DOCUMENTS

| | | | |
|---|---|---|---|
| DE | 2450996 | | 5/1976 |
| DE | 2900 866 | | 7/1980 |
| DE | 2900866 | | 7/1980 |
| DE | 4222193 | | 1/1993 |
| EP | 1365074 | | 11/2003 |
| RU | 1227836 | | 4/1986 |
| WO | 97/17564 | | 5/1997 |
| WO | WO2004/031637 | * | 4/2004 |

* cited by examiner

*Primary Examiner*—James M Hewitt
*Assistant Examiner*—Gwendolyn D Fournet
(74) *Attorney, Agent, or Firm*—Dilworth & Barrese, LLP.

(57) ABSTRACT

The invention relates to a quick coupling comprising a base plate and a support plate, with the mounting frame being guided movably at the base plate and having means for connection to the support plate. In accordance with the invention, the support plate is moved toward the base plate by means of the mounting frame to close the coupling.

15 Claims, 8 Drawing Sheets

QUICK COUPLING

BACKGROUND OF THE INVENTION

The present invention relates to a quick coupling for the connection of pressure media feeds in a hydraulic system. Such quick-couplings are in particular used in the connection of pressure media feeds to hydraulically operated construction machinery, e.g. to connect an implement of the construction machine to the pressure supply fast and easily.

Quick couplings are known for the connection of pressure media feeds which comprise a base plate and a support plate on which the pressure media feeds to be connected in each case are arranged. Clamping levers are pivotally supported around coaxial pivot bearing spigots on the base plate of such a known quick coupling, whereas clamping spigots are arranged parallel to the pivot bearing spigots on the support plate. The clamping lever has curved engagement slots with which it engages over the clamping spigots projecting beyond the support plate to close the coupling.

To close the quick coupling, the support plate is now arranged opposite the base plate and is pulled toward the base plate by rotating the clamping lever.

A disadvantage of this construction lies in the fact that the curved engagement slots generate a force component transversely to the coupling direction in the coupling procedure and that additional lateral forces can arise in that the couplings are not arranged pair-wise at both sides of the pivot axis of the clamping levers. Furthermore, on the coupling, the support plate which is very heavy at large nominal widths, must be held with the one hand, while the clamping lever is actuated with the other hand. A further disadvantage of the known construction lies in the fact that, with large nominal widths, the very large forces have to be transmitted via the collet chucks and the latter have to be given a relatively large dimension for this reason. This circumstance requires very wide engagement slots which are then reflected in the supporting cross-section and in the diameter of the clamping levers, which increases the weight and the size of the construction.

SUMMARY OF THE INVENTION

It is therefore the object of the present invention to provide a quick coupling which is simple to operate, has a compact and favorably priced design and nevertheless permits a secure and low-wear connection of pressure media feeds.

This object is satisfied in accordance with the invention by a quick coupling having a base plate and a support plate as described herein. For this purpose, the quick coupling in accordance with the invention includes a mounting frame which is movably guided at the base plate and has means for the connection, or a connecting mechanism which comprises guide grooves, to the support plate.

The mounting frame and the support plate can be connected to one another in a force transmitting manner due to the means for the connection to the support plate. The mounting frame absorbs the large forces which arise on the connection of pressure media feeds. The support plate can additionally first be connected to the mounting frame and so no longer has to be held by hand during the coupling process.

The support plate connected to the mounting frame is moved toward the base plate by means of the mounting frame on the closing of the coupling. The pressure media feeds attached in each case to the base plate and the support plate are hereby also pushed into one another and so connected to one another in a pressure tight manner. The mounting frame transmits the required force onto the support plate and thus permits a secure and compact connection.

Furthermore, as many pressure media feeds as desired and arranged as desired can be coupled by the use of the mounting frame since forces arising transversely to the coupling direction are avoided by the guidance of the mounting frame at the base plate or are taken up by the guidance. The guidance of the mounting frame at the base plate therefore holds the mounting frame transversely to the coupling direction, whereas the mounting frame is movable in linear fashion toward the base plate in the coupling direction.

Advantageously, the movement between the mounting frame and the base plate arises in this process due to a compressive force acting between the mounting frame and the base plate. For this purpose, the base plate is advantageously arranged between a front part and a rear part of the mounting frame. The compressive force is then advantageously generated between the rear part of the mounting frame and the base plate so that the support plate connected to the front part of the mounting frame is pulled toward the base plate by the mounting frame. This has the advantage that tractive forces only occur in the mounting frame which is well suited for the absorption of tractive forces due to its construction. All other parts only have to absorb compressive forces and so can be configured in a substantially more compact manner.

The mounting frame is advantageously movable toward the base plate by the rotation of an eccentric member. Such an eccentric member is an extremely compact and nevertheless stable possibility to absorb the high forces which occur on the connection of pressure media feeds.

Advantageously, the pressure between the base plate and the mounting frame, by which the support plate connected to the mounting plate is pressed toward the base plate to close the coupling, is created by the rotation of the eccentric member. If the support plate is connected to a front side of the mounting frame, the spacing which becomes larger between the outer edge of the eccentric member and its axis on a rotation of the eccentric member exerts a pressure between a rear side of the mounting frame and the base plate so that the front side of the mounting frame, which is connected to the support plate, is pulled toward the base plate. Large forces can thus be transmitted and absorbed, with the construction of mounting frame and eccentric member permitting a skillful distribution of these forces. This makes it possible to keep the constructing compact and simple and to use components which are simple and can thus be manufactured cheaply.

A lever is advantageously attached to the eccentric member via which the eccentric member can be rotated around its axis of rotation. A simple and comfortable operation with a simultaneously high coupling force can be achieved by the lever effect of the lever.

The mounting frame is furthermore advantageously pretensioned at the base plate so that it automatically moves in one direction and only has to be moved by application of force in the other direction. The pre-tension normally moves the support plate away from the base plate to facilitate the opening of the quick coupling.

The mounting frame furthermore advantageously includes mounting yokes and mounting struts. In this connection, the mounting struts act as a guidance with the base plate, whereas the mounting yokes connect the mounting struts at the rear and at the front. This permits a favorable distribution of the forces which arise with a simultaneously simple and cost-effective design. In this connection, the mounting struts advantageously run in cut-outs of the base plate so that the mounting frame is held at the sides by the base plate, but is movable along the mounting struts. The front mounting yokes can advantageously be connected to the support plate, whereas the rear mounting yokes absorb the pressure by the rotation of the eccentric member and pass it on to the front mounting yokes. The rear yoke is thus pressed away from the base plate by rotation of the eccentric member and the front yoke is thus pulled toward the base plate with the carrier plate.

The mounting frame in accordance with the invention furthermore advantageously includes a guide into which the support plate can be pushed. This permits a simple connection of the support plate to the mounting frame and thus a comfortable closing of the coupling. The support plate is first pushed into the guide of the mounting frame, whereupon the mounting frame is moved with the support plate toward the base plate and thus closes the connection.

The guide is advantageously arranged substantially perpendicular to the direction of movement of the mounting frame. The support plate is thus pushed into the mounting plate essentially from the side, with the guide holding the support plate securely in the coupling direction and transmitting the forces arising on the coupling over the total length of the guide onto the support plate. This in turn makes possible a simple construction which is thus cheap to manufacture. The guide advantageously has stop elements on one side which stop the support plate in the correct position in the guide with respect to the base plate so that a simple and comfortable coupling becomes possible.

A fastening element is advantageously attached to the base plate and the quick coupling can e.g. be mounted on a construction vehicle by it.

The eccentric member is furthermore advantageously rotatably supported at the base plate. Rotary bearing spigots can be arranged laterally at the base plate for this purpose and the eccentric member is supported thereon. Advantageously, two eccentric members are provided which are supported on respective oppositely disposed sides at the same level of the base plate with the same axis direction.

Due to the fixed mounting of the base plate to a construction vehicle, for example, the eccentric member can be rotated easily toward the base plate since this is itself immovable and so forms a fixed abutment.

Advantageously, with such a rotatable support of the eccentric member on the base plate, the eccentric member presses toward a rear mounting yoke of the mounting frame for the movement of the mounting frame when it is rotated around its axis supported on the base plate. The mounting frame is hereby moved to the rear toward the base plate and the support plate connected to the front mounting yoke is thus pressed toward the base plate. This establishes a secure connection of the pressure media feeds attached to the base plate and the support plate.

This arrangement is of great advantage because the eccentric member only has to transmit compressive forces and can thus be designed in a compact and simple manner. Only the mounting frame transmits tractive forces from the rear mounting yoke to the front mounting yoke. In particular when the mounting frame includes mounting struts which connect the mounting yokes on both sides, the tractive forces which occur can be transmitted effectively without increasing the complexity or the weight of the construction too much.

Alternatively, the eccentric member can, however, also be rotatably supported at the rear mounting yoke of the mounting frame. Advantageously, the eccentric member supported at the rear mounting yoke then presses against the base plate and thus presses the support plate connected to the front mounting yoke against the base plate. Substantially the same advantages result from this construction as from the just described construction with a reverse arrangement, with the mounting frame now advantageously being fastened to the construction vehicle and the base plate being movably guided in the mounting frame.

The fixed arrangement of the base plate has the advantage with respect to the fixed arrangement of the mounting frame, however, that the pressure media feeds are not moved on every closing of the quick coupling with an immobile base plate on the construction vehicle so that this arrangement reduces the wear.

The eccentric member is advantageously designed such that it is self-locking in a closed position. This has the advantage that the eccentric member cannot move out of the closed position independently and thus release the quick coupling. The eccentric member rather locks itself as soon as it has been rotated into the closed position. To open the quick coupling, a force from outside must now be exerted again to rotate the eccentric member against its self-locking out of the closed position and thus to open the quick coupling. This increases the security and reduces the wear since a possibly additionally arranged latching element does not have to absorb any force due to the self-locking of the eccentric member, but must only protect the eccentric member against unwanted rotation.

For this purpose, the eccentric member advantageously has a substantially planar outer edge at least on one side. In the latching position, this planar outer edge comes into communication with the mating element of the eccentric member, on a support of the eccentric member at the base plate, that is with the rear mounting yoke. The eccentric member is hereby self-locked in this position since the substantially planar outer edge, which is pressed toward the mating element, resists a rotation out of this position. The wear is also minimized by such a construction since only a minimal surface pressure arises by the surface contact between the planar outer edge and the mating element, whereby the forces which arise are ideally distributed over the elements involved.

Furthermore, the eccentric member advantageously has substantially planar edges on two sides, said planar edges having a different spacing from the axis of rotation. The eccentric member contacts the mating element in a closed position with the one planar edge with the larger spacing from the axis of rotation, whereas it contacts the mating element with an open coupling with the substantially planar edge with the lower spacing from the axis of rotation. In the open position of the quick coupling, the spacing between the base plate and rear mounting yoke is thus low, but if the eccentric member is rotated so that it presses against the mating element with the planar edge with the larger spacing from the axis of rotation, the spacing between the rear mounting yoke and the base plate is made larger so that the front mounting yoke presses against the base plate with the support plate. This construction permits a particularly comfortable coupling on and uncoupling since the eccentric member is self-locked in each case both in the closed position and with an open fast coupling.

Furthermore, a curved region is advantageously located between the substantially planar outer edges so that the eccentric member can be moved constantly and without the occurrence of force peaks from an open position into the closed position and back again.

Furthermore, the base plate advantageously has at least one guide pin which engages into a cut-out of the support plate on the movement of the support plate against the base plate. This guide pin ensures that the support plate is brought into the right position relative to the base plate and additionally guides the base plate in the coupling procedure. The tip of the guide pin is advantageously chamfered so that a centering function is additionally produced.

Furthermore, the quick coupling of the present invention advantageously has a latching element. With this, the quick coupling can be latched in a closed position so that an additional protection against unwanted opening results. The latching element advantageously latches the eccentric member in its closed position. If the eccentric member is moved via a lever, the latching element can also be arranged such that it prevents the movement of the lever out of the closed position.

Overall, the possibility results by the configuration of the quick coupling with the mounting frame to couple as many pressure media feeds as desired of any size desired since the larger forces can be tolerated due to the adaptation of the mounting frame, of the base plate and of the support plate without the construction losing its compact construction. In particular the use of the eccentric member for the generation of a pressure between the base plate and a rear mounting yoke makes it possible for the eccentric member only to have to absorb compressive forces and so to be able to have a compact design.

BRIEF DESCRIPTION OF THE DRAWINGS

An embodiment of the present invention will now be described in more detail with reference to drawings. There are shown:

FIG. 8: a perspective view of the embodiment of the present invention in an open position, with the support plate being pushed further in;

DESCRIPTION OF THE PREFERRED EMBODIMENTS

Figure 1:
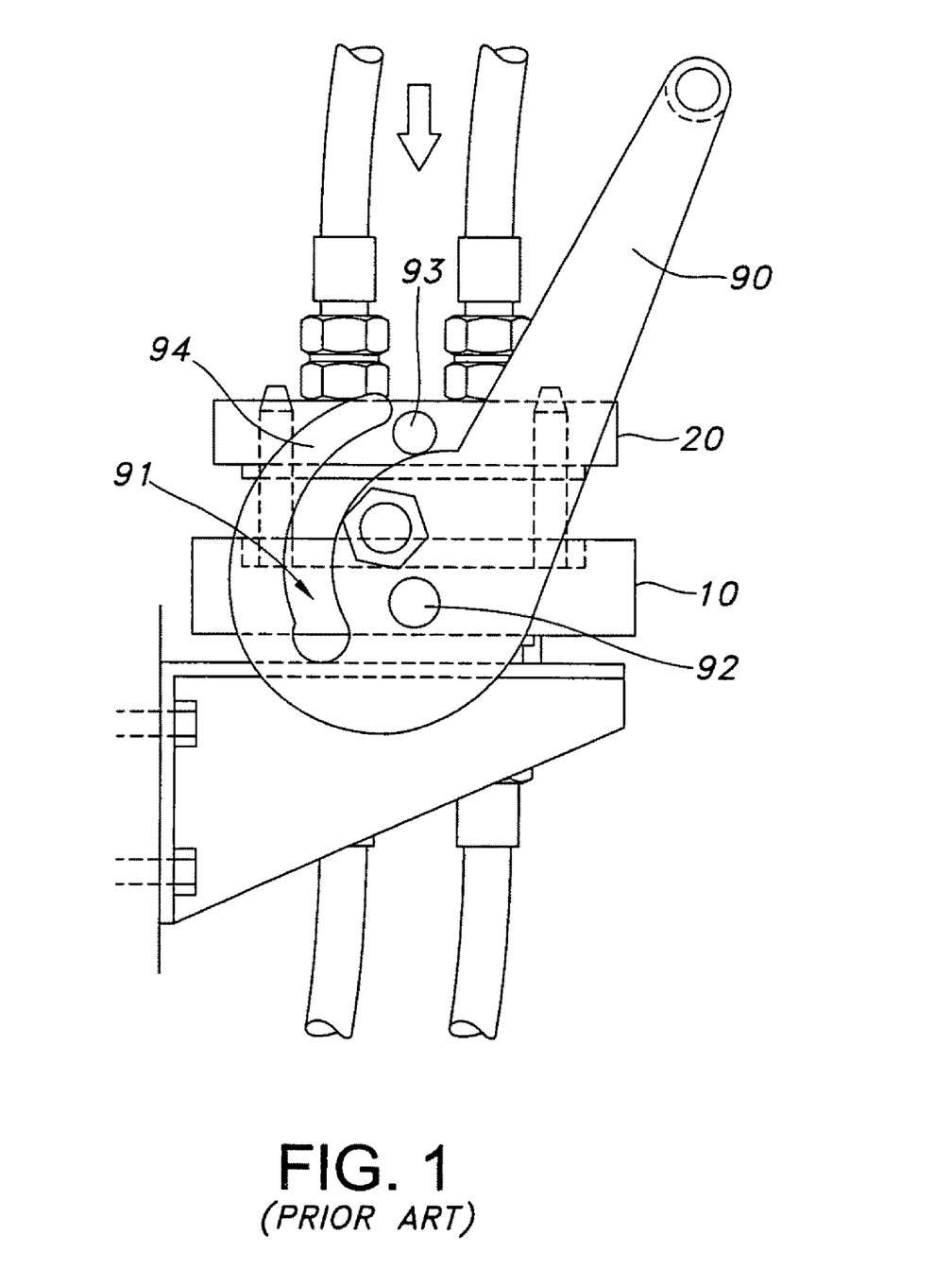
FIG. 1: a side view of a quick coupling in accordance with the prior art.

FIG. 1 shows a quick coupling in accordance with the prior art. This also has a base plate 10 and a support plate 20 to which the pressure media feeds to be connected are attached. Collect chucks 90 are rotatably supported at coaxial pivot bearing spigots 92 on both sides at the base plate 10. The collet chucks 90 have curved engagement slots 91 with which they engage over collet chucks 93 projecting from the edges of the support plate 20 coaxially to one another and parallel to the pivot bearing spigots 92. The disadvantage in this construction is that the curved engagement slots 91 generate a force component transversely to the coupling direction on the coupling process and lateral forces can additionally arise in that the couplings are not arranged pair-wise at both sides of the pivot axis of the collet chucks 90. Furthermore, on the coupling, the support plate 20 which is very heavy at large nominal widths, must be held with the one hand, while the collet chuck 90 is actuated with the other hand. A further disadvantage of the known construction lies in the fact that, with large nominal widths, the very large forces have to be transmitted via the collet chucks 93 and the latter have to be given a relatively large dimension for this reason. This requires very wide engagement slots 91 and a curved clamping element 94 likewise of very large dimensions, which increases the weight and size of the collet chucks 90 enormously overall.

Figure 2:
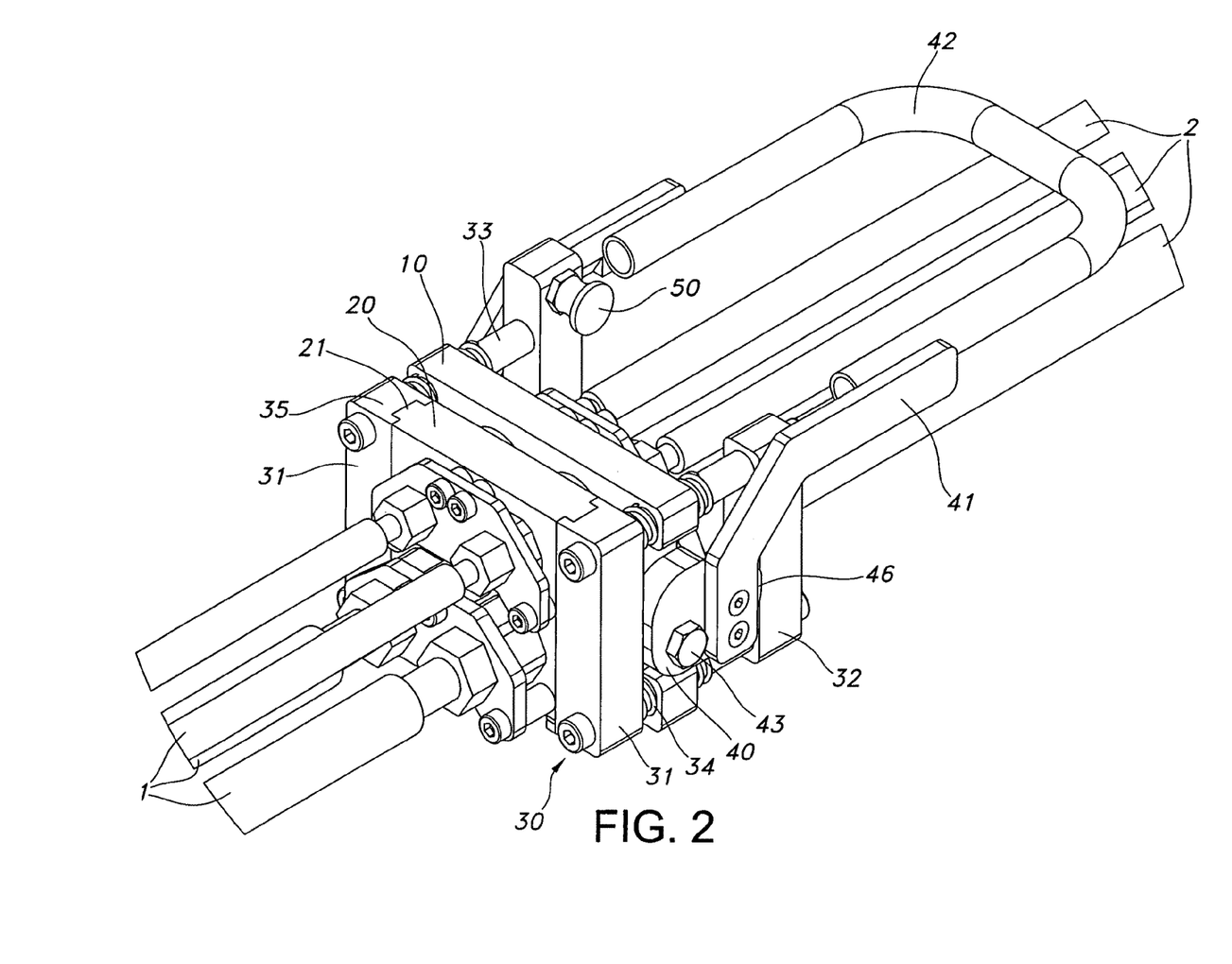
FIG. 2: a perspective view of an embodiment of the present invention.

FIG. 2 now shows an embodiment of the present invention. The mounting frame 30 of mounting yokes 31 and 32 and mounting struts 33 is guided movably at the base plate 10 at which the pressure media feeds of the pressure lines 2 are arranged. For this purpose, the mounting struts 33 of the mounting frame 30 run in corresponding cut-outs of the base plate 10, in this case in bores in the corners of the base plate. The support plate 20, on which the pressure media feeds for the pressure lines 1 are arranged, can be connected to the mounting frame 30 via a guide of springs 21 to the side at the support plate 20 and grooves 35 in the front mounting yokes 31 so that the coupling can be closed in that the mounting frame 30 is moved rearwardly toward the base plate 10 and the support plate 20 connected to the front mounting yokes 31 is thus pulled toward the base plate 10.

In this connection, a resilient member comprising springs 34 is provided which is arranged between the front mounting yokes 31 and the base plate 10 around the mounting struts 33 and thus pre-tension the mounting frame 30 toward the front with respect to the base plate. The springs 34 facilitate the opening of the coupling in this way since they press the support plate 20 away from the base plate 10 on the opening.

Eccentric members 40 are provided for the closing of the coupling which are rotatably attached to two oppositely disposed sides of the base plate 10 via pivot bearing spigots 43. A lever comprising angled members 41 and a handle 42 is attached to the eccentric members 40 and the eccentric members 40 can be rotated via it around the pivot bearing spigots 43.

The quick coupling is shown in a closed coupling position here. For this purpose, the eccentric members 40 are rotated so that they press against the inner sides of the rear mounting yokes 32 with a side 46 which has a large spacing from the axis of rotation. The rear mounting yokes 32 thereby have a maximum spacing from the base plate 10 such that the support plate 20 connected to the front mounting yokes 31 has a minimal spacing with the base plate 10. The connection is thus established between the pressure media feeds at the support plate 20 and the base plate 10.

This connection can in particular not be released in that the side 46 of the eccentric member 40 has a substantially planar outer edge with which the eccentric member 40 is in slidable contact with the rear mounting yoke 32. A self-locking thereby occurs since the force which presses the rear mounting yoke 32 away from the base plate 10 is transmitted via the pivot bearing spigots 43 and the eccentric members 40 in a straight line and perpendicular to the planar outer edge of the side 46 to the rear mounting yokes 32 of the mounting frame 30. In addition, a latching element 50 is provided as an additional securing which prevents the lever attached to the eccentric members 40 from accidentally being moved out of the closed position.

Figure 3A:
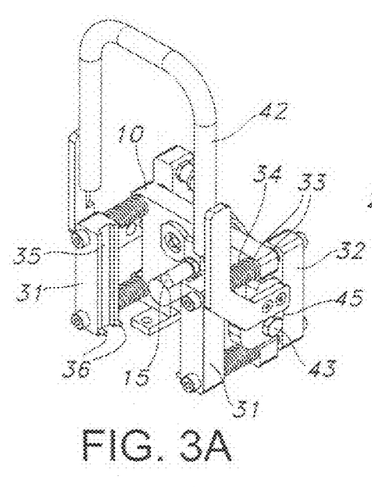
FIG. 3a: a perspective view of the embodiment of the present invention in an open position without a support plate.
Figure 3B:
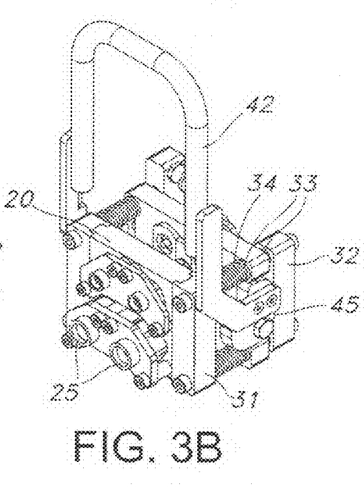
FIG. 3b: a perspective view of the embodiment of the present invention in the open position with a support plate.

FIG. 3a and FIG. 3b show the embodiment of the quick coupling in accordance with the invention in an open position, with FIG. 3a showing the quick coupling without the support plate 20, and FIG. 3b the quick coupling with the support plate 20.

In FIG. 3a, the groove 35 at the front mounting yokes 31 can be seen which extends along the inner sides of the mounting yokes 31 over its total length. In addition, stop elements 36 are provided at the inner side of the front mounting yokes 31 in the vicinity of the lower edge and fix the support plate 20 in the correct position on a pushing of the support plate 20 into the groove 35. The support plate must thereby no longer be held by hand in the actual coupling process, which substantially facilitates the coupling.

To bring the respective pressure media feeds exactly into coincidence with one another on a movement of the support plate 20 toward the base plate 10, a guide pin 15 is provided on the base plate 10 which has a chamfered tip and is arranged between the pressure media feeds at the center of the base plate 10. In this connection, the guide pin 15 is arranged parallel to the mounting struts 33 of the mounting frame 30 and faces forward in the direction of the support plate. On a movement of the support plate 20 in the direction of the base plate 10, this guide pin 15 engages into a cut-out in the support plate 20 and so guides the support plate and the base plate exactly toward one another.

This support plate 20 is pushed laterally into the grooves 35 of the front mounting yokes 31 with the help of springs arranged laterally at the support plate 20. The support plate 20 is held in a position precisely opposite the base plate 10 by the stop elements 36. Pressure media feeds 25 are arranged on the support plate 20 which are thus arranged opposite the corresponding pressure media feeds on the base plate 10.

The lever attached to the eccentric members and made up of the handle 42 and the angled elements 41 is at such a position with respect to the mounting frame that the handle 42 extends substantially in a plane with the front mounting yokes 31 and the support plate 20. The eccentric members 40 in FIG. 3a and FIG. 3b are thereby rotated into such a position that the inner sides of the rear mounting yokes 32 are pressed by the springs 34 toward a side 45 of the eccentric members which has a small spacing from the axis of rotation. The front mounting yokes 31 and thus the support plate 20 therefore have a maximum spacing from the base plate 10; the respective pressure media feeds are not in contact.

Figure 4A:
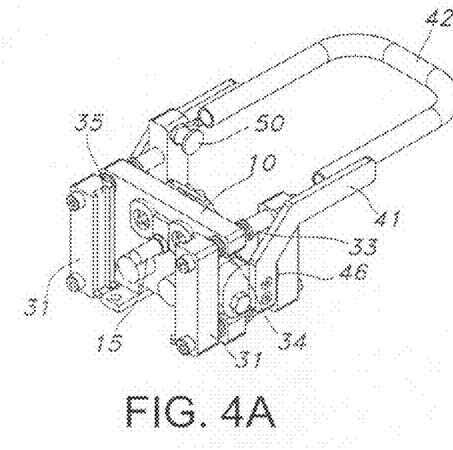
FIG. 4a: a perspective view of the embodiment of the present invention in a closed position without a support plate.
Figure 4B:
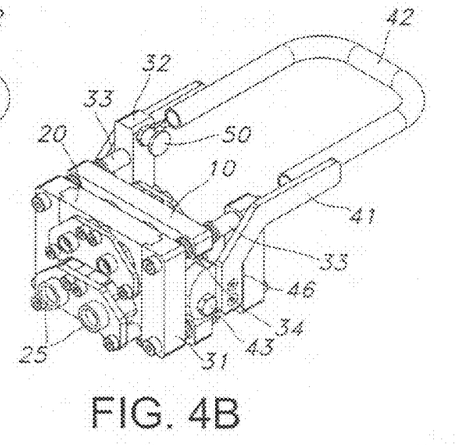
FIG. 4b: a perspective view of the embodiment of the present invention in a closed position with a support plate.

The embodiment of the quick coupling can now be seen in a closed position in FIG. 4a and FIG. 4b. For this purpose, the lever 42 was brought into a plane substantially perpendicular to the plane of the mounting yokes as well as of the base plate and the support plate, whereby the eccentric members 40 are rotated via the angled elements 41 around their axis of rotation into a closed position in which they lie with one side 46 on the inner sides of the rear mounting yokes 32. Since the eccentric members 40 are rotatably arranged at the base plate 10 and now press away the rear mounting yokes 32 via their sides 46, the front mounting yokes 31 are thereby pulled toward the base plate 10 by the mounting frame 30.

In FIG. 4a, the guide pin 15 is in turn to be seen at the center of the base plate 10, said guide pin being pushed into a corresponding opening in the support plate 20 and so centering the support plate 20 with respect to the base plate 10. The guide pin 15 thereby ensures, on the closing of the quick coupling, that the pressure media feeds 25 on the support plate 20 come to coincide with those on the base plate 10.

Furthermore, a latching element 50 can be seen which substantially comprises a pin which engages from the inside to the outside through the mounting yoke on an upper side of a rear mounting yoke 32 and is pre-tensioned outwardly. If the latching element 50 therefore projects out on the outer side of the rear mounting yoke 32, the angled elements 41 cannot be moved accidentally upwardly out of the closed position.

Figure 5A:
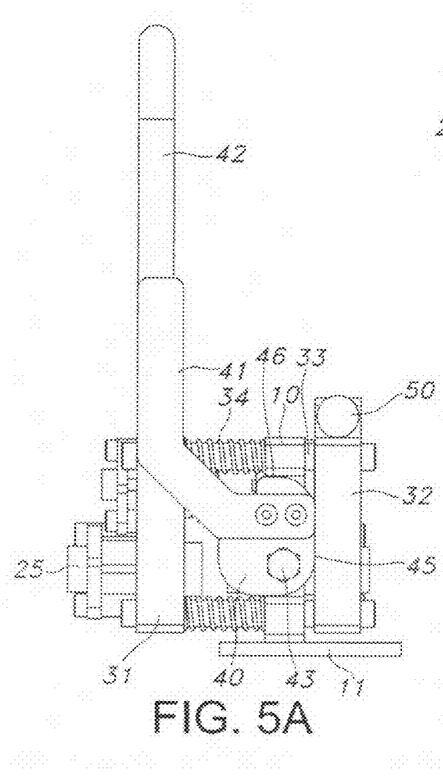
FIGS. 5a and 5b: are, respectively, a side view and a sectional view of the embodiment of the present invention in an open position.
Figure 5B:
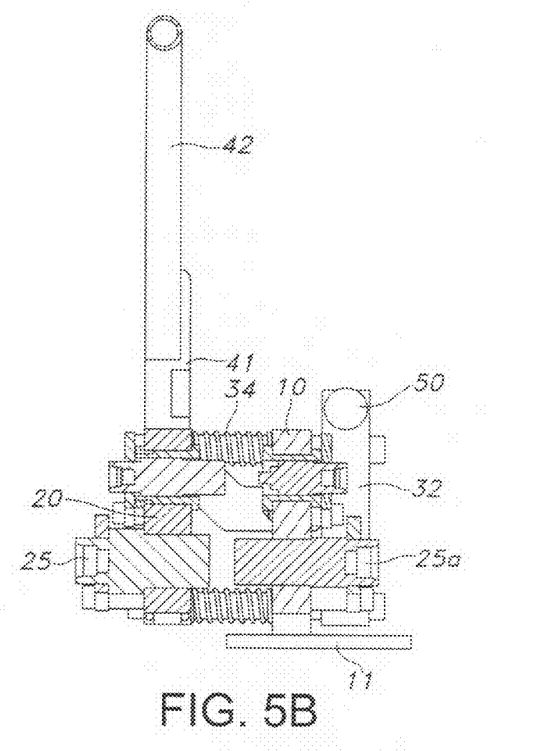

FIG. 5 shows a side view and a sectional view of the embodiment of the quick coupling in accordance with the invention in an open position. In this connection, the lever 42 lies in a plane with the front mounting yokes 31 and the support plate 20. The eccentric member 40 is thus rotated via the angled elements 41 such that its side 45 lies on an inner side of the rear mounting yoke 32. This side 45 of the eccentric member 40 has a substantially planar outer edge so that the total outer edge is in contact with the mounting yoke 32. It is furthermore easy to see that the side 45 of the eccentric member 40 has a substantially smaller spacing from the pivot bearing spigot 43 and thus from the axis of rotation of the eccentric member 40 than the side 46 which likewise has a substantially planar outer edge. The mounting frame is pushed to the front by the springs 34 in this open position due to the small spacing between the side 45 and the axis of rotation of the eccentric member 40.

The base plate 10 has bores through which the mounting struts 33 engage and with which the mounting frame is guided at the base plate 10. Furthermore, a fastening element 11 is provided at the base plate 10 which is located outside the mounting frame and with which the quick coupling can e.g. be fastened to a construction vehicle.

It can be seen particularly easily in the sectional view at the right in FIG. 5 how the pressure media feed 25 on the support plate 20 and the pressure media feed 25a on the base plate 10 lie opposite one another. Since the quick coupling is in an open position, the pressure media feeds 25 and 25a do not engage into one another so that the support plate 20 can be displaced along its guide in the front mounting yokes 31.

Figure 6A:
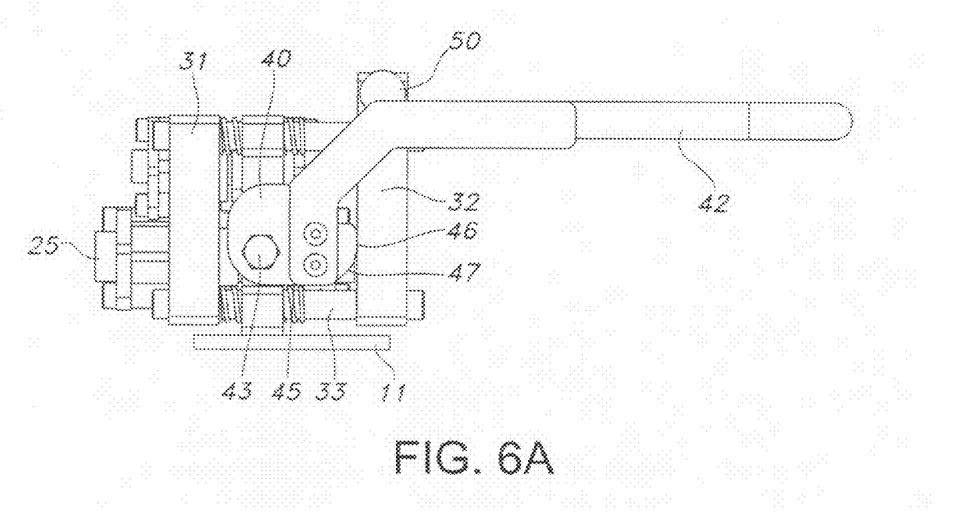
FIGS. 6a and 6b: are, respectively, a side view and a sectional view of the embodiment of the present invention in a closed position.
Figure 6B:
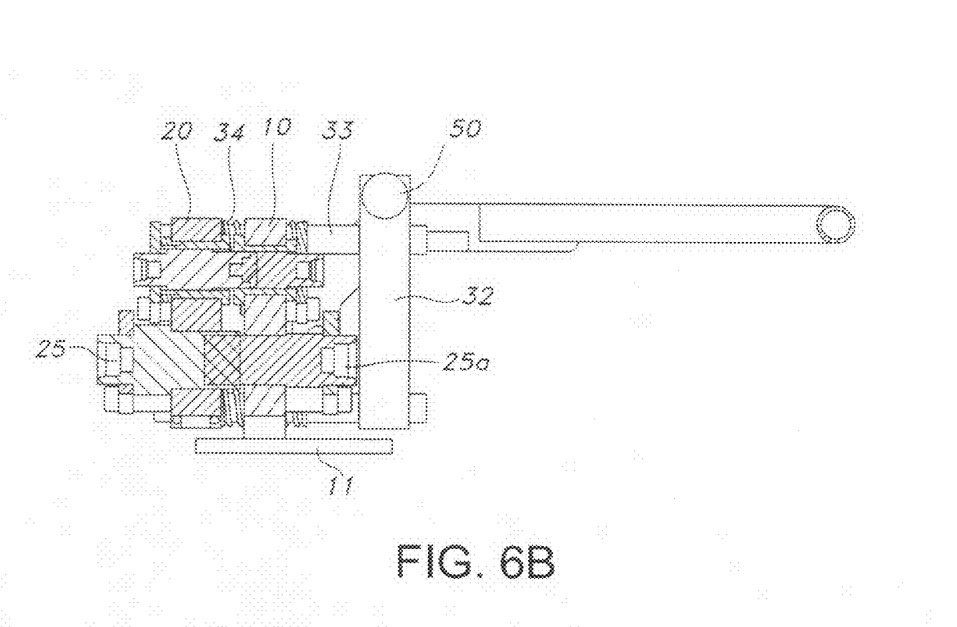

FIG. 6 now shows a sectional view and a side view of the embodiment of the quick coupling in accordance with the invention in a closed position. For this purpose, the handle 42 was rotated into a plane which stands substantially perpendicular on the plane of the base plate and support plate. The eccentric members 40 were hereby rotated around their pivot bearing spigots 43 with which they are attached to the base plate 10. They are thereby no longer in contact with the inner side of the rear mounting yoke 32 at their side 45, but at their side 46. The side 46 of the eccentric member 40 also has a substantially planar outer edge and thus lies areally on the inner side of the mounting frame. Due to the larger spacing of the side 46 from the axis of rotation of the eccentric member 40, the spacing between the base plate 10 and the rear mounting yoke 32 of the mounting frame is now larger so that the mounting yoke 31 and the support plate 20 connected thereto is pulled toward the base plate 10 by means of the mounting frame.

To facilitate the movement from an open position into this closed position, the eccentric member 40 has a curved region 47 between the sides 45 and 46 with substantially planar outer edges so that the eccentric member 40 can be rotated from the one position into the other in constant movement.

An imaginary connection line between the axis of rotation of the eccentric member 40 and the center of the substantially planar outer edge of the side 46 stands perpendicular on this planar outer edge so that coupling forces which press the base plate 10 to the rear away from the support plate stand perpendicular on the connection surface between the eccentric member and the rear mounting yoke 32. This makes it possible, on the one hand, for the quick coupling in accordance with the invention to be self-locked in the closed position and not release itself therefrom without a force effect from outside onto the lever. In addition, the planar outer edge of the side 46 has the advantage that due to the areal contact of this planar outer edge with the rear mounting yoke 32 the forces which arise are distributed over a large area which reduces the wear and permits a relatively compact construction.

It can now in particular be seen easily in the sectional view at the top in FIG. 6 how the pressure media feeds 25 of the support plate 20 and the pressure media feeds 25a of the base plate 10 engage into one another and are connected to one another in a pressure tight manner in this closed position of the quick coupling in accordance with the invention.

The coupling process will now be explained step by step in FIG. 7 to FIG. 12.

Figure 7:
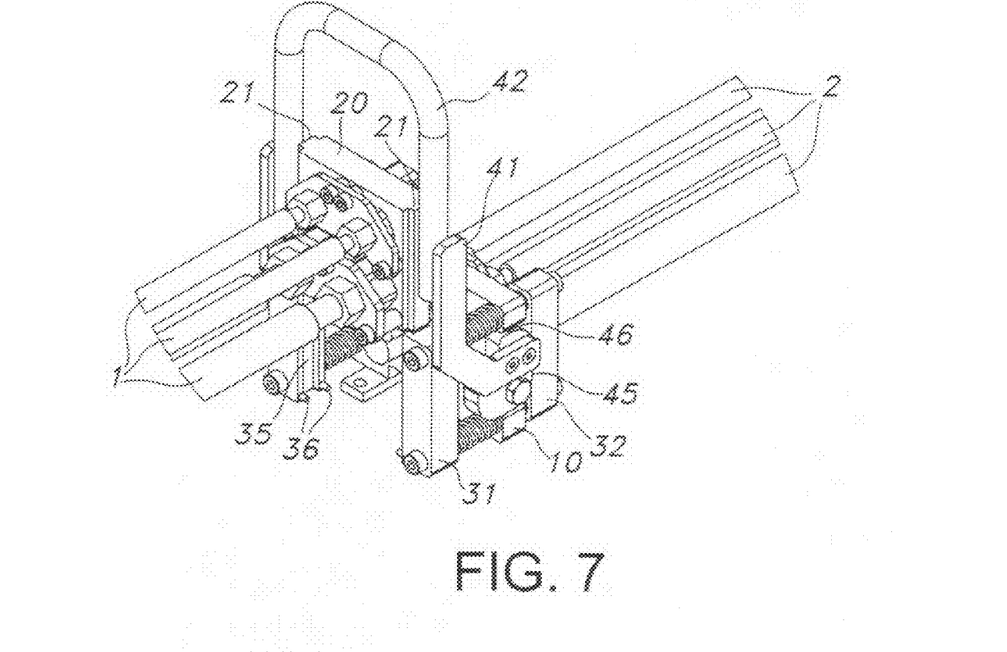
FIG. 7: a perspective view of the embodiment of the present invention in an open position.

FIG. 7 shows the embodiment of the quick coupling in accordance with the invention in an open position, with the support plate 20 not yet being connected to the mounting frame 30. The support plate 20 is, however, already arranged above and parallel to the front mounting yokes 31. The springs 21 on oppositely disposed sides of the support plate 20 are brought into coincidence with the grooves 35 on the inner sides of the front mounting yokes 31.

Figure 8:
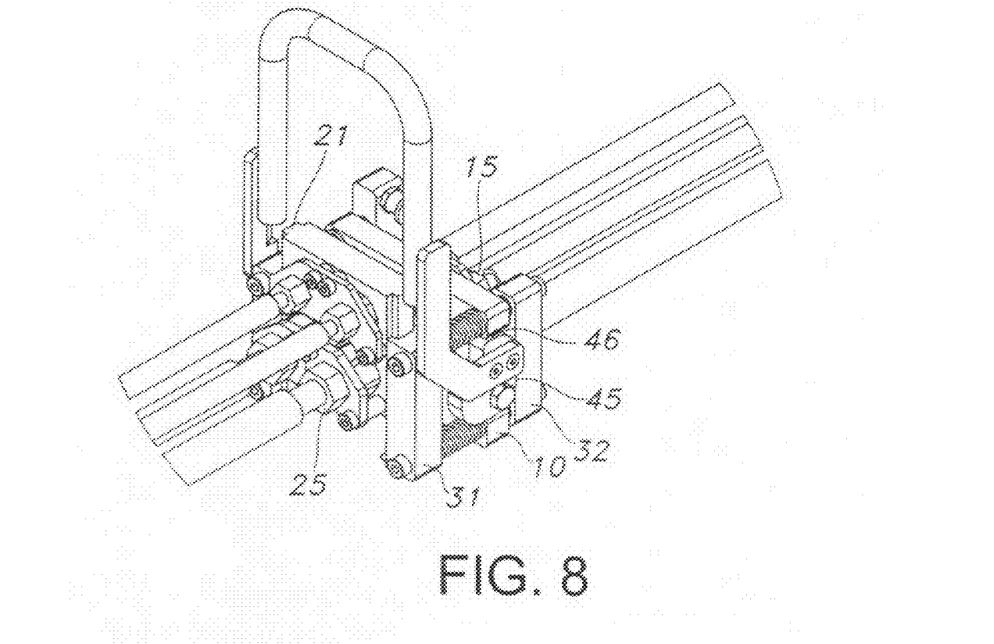

As can be seen in FIG. 8, the support plate 20 is thereupon pushed laterally into the mounting frame in that the springs 21 are pushed into the guide formed by the grooves 35.

The eccentric member 40 is located both in FIG. 8 and in FIG. 7 in the open position in which its side 45 is in contact with the rear mounting yokes 32 so that the front mounting yokes 31 are pressed to the front away from the base plate 10 by the springs 34. The spacing between the front mounting yokes 31 with the support plate 20 and the base plate 10 is thereby at a maximum so that the pressure media feeds 25 on the support plate 20 and the pressure media feeds 25a corresponding thereto on the base plate 10 are not in contact with one another and the support plate 20 can be pushed into the mounting frame without hindrance.

Figure 9:
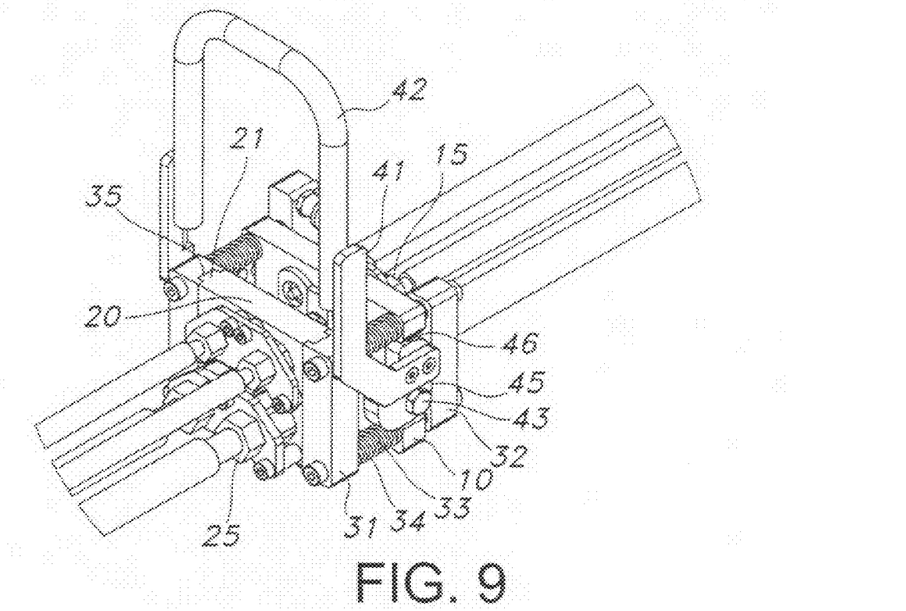
FIG. 9: a perspective view of the embodiment of the present invention in an open position, with the support plate being pushed in completely.

FIG. 9 furthermore shows the embodiment of the quick coupling in accordance with the invention in the open position, with the support plate 20 now being completely pushed into the mounting frame 30. It is now held in a force transmitting manner in the mounting frame in a direction perpendicular to the mounting yokes 31 by the guidance of grooves 35 and springs 21. In this completely inserted position, the pressure media feeds 25 are disposed directly opposite the corresponding pressure media feeds 25a on the base plate 10.

The mounting struts 33 which are screwed in bores at the top and bottom in the mounting yokes 31 and 32 thus form a rectangular mounting frame together with the mounting yokes. With these mounting struts 33, the mounting frame now runs on the base plate 10 rearwardly or forwardly in a direction perpendicular to the base plate 10 on the opening or closing of the quick coupling. The mounting frame is guided by the mounting struts 33 which engage through bores in the corners of the base plate 10 and are pushed forward by springs 34.

Figure 10:
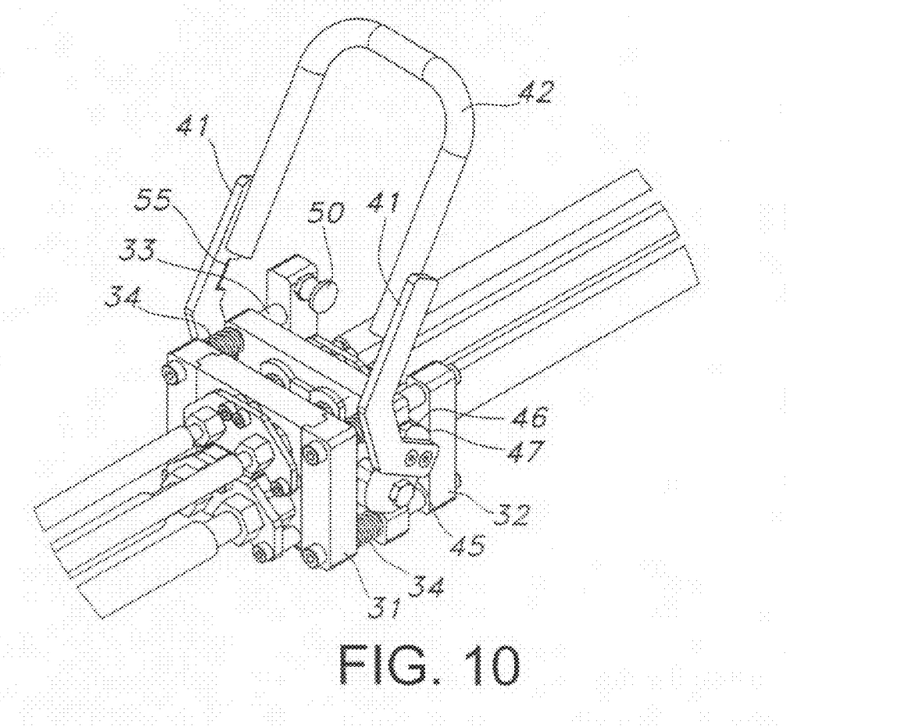
FIG. 10: a perspective view of an embodiment of the present invention in a partly closed position.

FIG. 10 show the embodiment of the present quick coupling in an only partly coupled state. For this purpose, the lever 42 is moved rearwardly so that it has rotated the eccentric members 40 via the angled elements 41 out of the completely open position. The eccentric members 40 are no longer in contact with the rear mounting yokes 32 at the side 45 which has a small spacing from the axis of rotation, but rather contact the inner sides of the rear mounting yokes 32 at the curved region 47. Due to the curvature of this region 47, no force peaks occur on a rotation of the eccentric members since the pressure development between the eccentric member and the mounting yokes 32 is constant. The front mounting yokes 31 with the support plate 20 are now pressed by the rotation of the eccentric member toward the base plate 10 by the mounting frame 30 with the mounting struts 33. This takes place against the pre-tension by the springs 34 which are compressed by this movement of the mounting frame 30.

A chamfer 55 is provided on the angled element 41 at the level of the latching element 50. This chamfer 55 is located on the inner side of the angled element 41 and thus, when the angled element 41 is rotated with respect to the mounting frame via the handle 42, presses the latching element inwardly and allows the angled element 41 to pass the latching element 50 in this direction. The chamfer 55 is provided only at a rear side of the angled element 41 for this purpose, whereas no chamfer is present at the front side.

Figure 11:
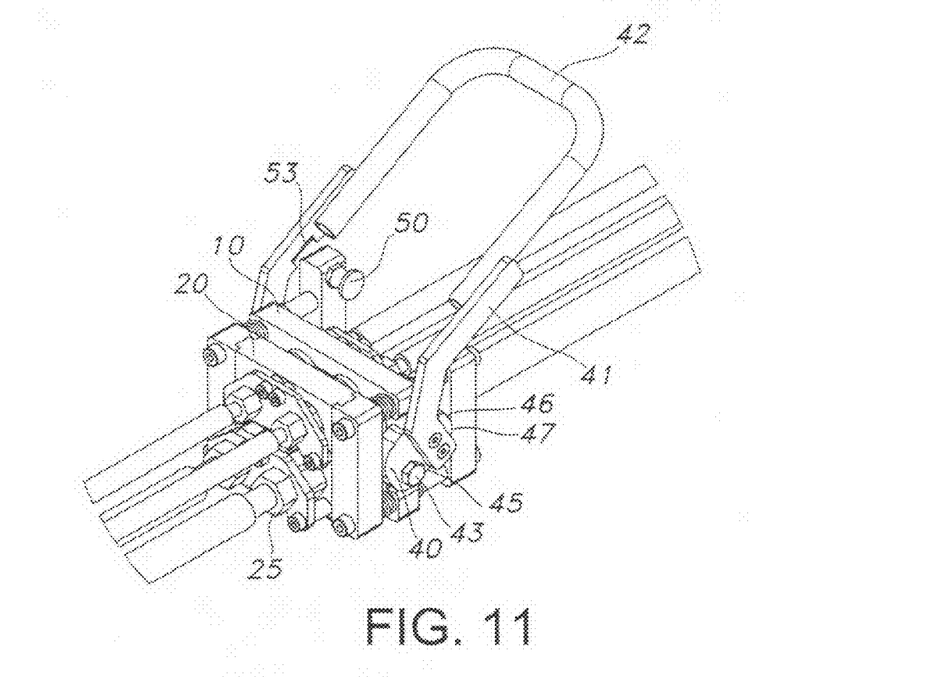
FIG. 11: a perspective view of an embodiment of the present invention in a partly closed position.

The quick coupling in accordance with the invention is shown in an even further closed position in FIG. 11. The angled element 41 has already almost passed the latching element 50 and thus further rotated the eccentric member 40 along the curved outer edge 47. The spacing between the base plate 10 and the rear mounting yokes 32 has thereby grown further so that the support plate 20 is pulled even further toward the base plate 10 by means of the mounting frame.

Figure 12:
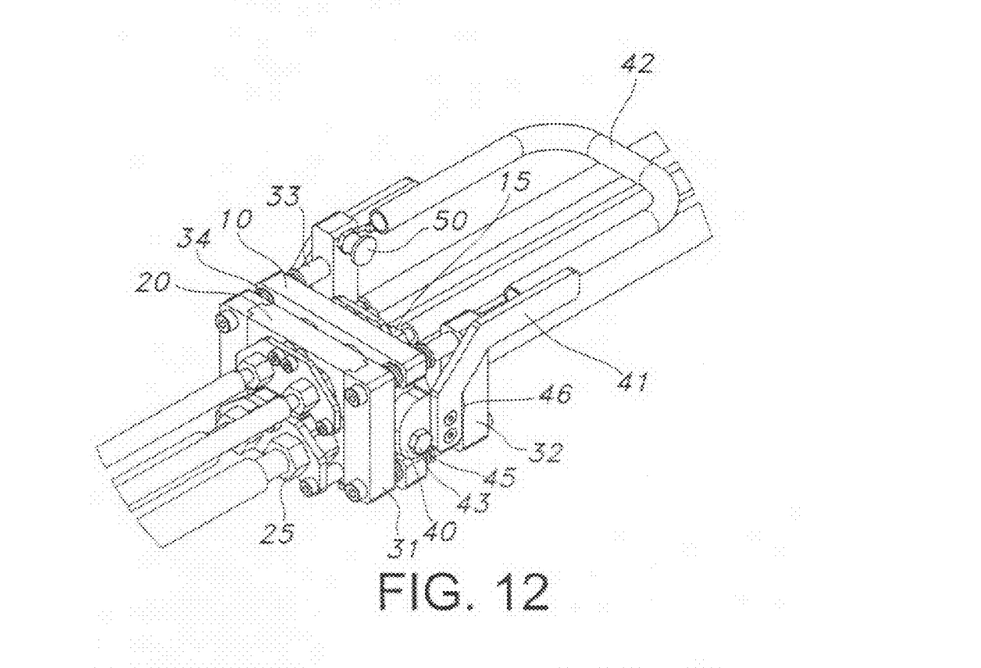
FIG. 12: a perspective view of the embodiment of the present invention in a completely closed position.

FIG. 12 now shows the embodiment of the quick coupling in accordance with the invention in its closed position. The angled elements 41 have now been rotated past the latch element 50, with the chamfer 55 having pressed the latching element 50 inwardly against its pre-tension. The angled elements 41 have now, however, completely passed the latching element 50 so that the latching element is again pressed outwardly by its pre-tension and the angled elements 41 can now no longer be moved out of their closed position without a manual actuation of the latching element 50.

In this position, the eccentric member 40 contacts the inner sides of the rear mounting yoke 32 at its side 46 which has a substantially planar outer edge and has a large spacing from the axis of rotation with the pivot bearing spigot 43. The pressure media feeds 25 which are arranged on the support plate 20 are thereby coupled in a pressure-tight manner to the pressure media feeds 25a on the base plate 10. The forces which arise are transmitted from the base plate 10 to the support plate 20 via the mounting frame from mounting yokes 31 and 32 and mounting struts 33 and via the eccentric member 40 which is rotatably attached to the base plate 10 by means of a pivot bearing spigot 43.

This construction in particular has the advantage that tractive forces only occur in the mounting frame which can absorb them particularly well due to its construction from mounting yokes 31 and 32 standing perpendicular thereto. In contrast, only compressive forces act on the eccentric member 40 so that it can be designed in a compact and therefore relatively light manner.

This construction in particular has the advantage that as many pressure media feeds as desired of any size desired can be coupled since the construction of mounting frame and eccentric member can easily be adapted to the larger forces. This construction also only requires simple components which can thus be manufactured at low cost and only have to be worked coarsely and only have to be provided with bores.

The invention claimed is:

1. A quick coupling comprising:
a base plate, and a support plate connectable to a mounting frame for the connection of pressure media feeds in a hydraulic system, wherein
the mounting frame is movably guided at the base plate;
connecting mechanism associated with the mounting frame for connecting the support plate thereto; and
a resilient member positioned between the base plate and the mounting frame, wherein the support plate is moved toward the base plate against the biasing force of the resilient member by the mounting frame to close the coupling,
wherein the support plate is movable toward the base plate by the rotation of an eccentric member, pivotally attached to the base plate,
wherein the mounting frame includes front and rear mounting yokes and mounting struts connecting the front and rear mounting yokes, said mounting struts being disposed through corresponding cut-outs in the base plate,
wherein a lever is attached to the eccentric member,
wherein the eccentric member is rotatably supported on the base plate and rotatably contacts the rear mounting yoke of the mounting frame, and
wherein the eccentric member presses against and rearwardly urges the rear mounting yoke in response to rotation of the eccentric member.

2. A quick coupling in accordance with claim 1, wherein the movement of the support plate toward the base plate arises on the basis of a compressive force between the mounting frame and the base plate, said compressive force being applied by the eccentric member.

3. A quick coupling in accordance with claim 2, wherein the compressive force between the base plate and the mounting frame arises by rotating the eccentric member from a first position to a second position where the base plate is moved toward the mounting frame against the biasing force of the resilient member.

4. A quick coupling in accordance with claim 3, wherein the mounting frame connecting mechanism includes guide grooves into which the support plate can be mounted.

5. A quick coupling in accordance with claim 4, wherein the guide grooves are arranged substantially perpendicular to the direction of movement of the base plate.

6. A quick coupling in accordance with claim 1, wherein the mounting frame includes at least one front mounting yoke and at least one rear mounting yoke, said base plate having opposite front and rear sides, and said front mounting yoke being positioned adjacent the front side of the base plate, the rear mounting yoke being positioned behind the rear side of the base plate.

7. A quick coupling in accordance with claim 1, wherein the eccentric member is self-locked in a closed position.

8. A quick coupling in accordance with claim 1, wherein the eccentric member has a substantially planar outer edge at least at one side.

9. A quick coupling in accordance with claim 8, wherein the eccentric member has substantially planar edges at two sides, said planar edges having a different spacing from the axis of rotation.

10. A quick coupling in accordance with claim 9, wherein a curved region is located between the substantially planar outer edges.

11. A quick coupling in accordance with claim 1, wherein the base plate has a guide pin which engages into a cut-out of the support plate.

12. A quick coupling in accordance with claim 1, the lever having a component attached to the eccentric member, said component including a chamfered portion on a rear edge thereof, and said quick coupling additionally comprising a latching element movably attached to the rear mounting yoke and disposed therethrough, wherein said chamfered portion of the lever component presses the latching element to permit the lever component to pass the latching element.

13. A quick coupling in accordance with claim 1, wherein one or more pressure media feeds are located at each of the base plate and the support plate.

14. The quick coupling in accordance with claim 1 wherein the resilient member comprises a helical compression spring.

15. A quick coupling device comprising:
a) a base plate having front and rear sides defining a longitudinal direction;
b) a mounting frame which is slidably movable with respect to the base plate between an open position and a closed position for the connection of pressure media feeds in a hydraulic system, the mounting frame having a rear yoke positioned behind the rear of the base plate and fixedly connected to a front yoke positioned in front of the base plate;
c) a support plate removably mountable to the front yoke; and
d) an eccentric member rotatably mounted to the base plate and in slidable contact with the rear yoke,
wherein the mounting frame is longitudinally movable between the open and closed positions in response to rotation of the eccentric member, and wherein the support plate is brought into closer engagement with the front side of the base plate and the rear yoke is longitudinally and rearwardly moved further away from the rear of the base plate when the mounting frame is in the closed position,
wherein the support plate is movable toward the base plate by the rotation of the eccentric member, pivotally attached to the base plate,
wherein a lever is attached to the eccentric member, and
wherein the eccentric member presses against and rearwardly urges the rear mounting yoke in response to rotation of the eccentric member.

* * * * *